(12) United States Patent
Ogura et al.

(10) Patent No.: US 11,433,911 B2
(45) Date of Patent: Sep. 6, 2022

(54) CONTROLLER FOR VEHICLE

(71) Applicant: TOYOTA JIDOSHA KABUSHIKI KAISHA, Toyota (JP)

(72) Inventors: Takashi Ogura, Seto (JP); Masahiro Kagami, Chiryu (JP); Yoshiaki Kikuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 16/802,835

(22) Filed: Feb. 27, 2020

(65) Prior Publication Data

US 2020/0276979 A1 Sep. 3, 2020

(30) Foreign Application Priority Data

Feb. 28, 2019 (JP) .............................. JP2019-035413

(51) Int. Cl.
*B60W 50/02* (2012.01)
*B60W 60/00* (2020.01)
*G07C 5/02* (2006.01)
*G07C 5/08* (2006.01)
*G07C 5/00* (2006.01)

(52) U.S. Cl.
CPC ...... *B60W 50/0205* (2013.01); *B60W 60/001* (2020.02); *G07C 5/02* (2013.01); *G07C 5/085* (2013.01); *G07C 5/008* (2013.01)

(58) Field of Classification Search
USPC ......................................................... 701/25
See application file for complete search history.

(56) References Cited

U.S. PATENT DOCUMENTS

| | | | |
|---|---|---|---|
| 2017/0372431 A1* | 12/2017 | Perl .......................... | G07C 5/085 |
| 2018/0276910 A1* | 9/2018 | Pitt ............................ | G07C 5/08 |
| 2019/0156599 A1* | 5/2019 | Jammoussi ............. | B60W 30/02 |

FOREIGN PATENT DOCUMENTS

| | | |
|---|---|---|
| JP | 2018-5943 A | 1/2018 |
| WO | 2020/053983 A1 | 3/2020 |

* cited by examiner

*Primary Examiner* — Tyler D Paige
(74) *Attorney, Agent, or Firm* — Sughrue Mion, PLLC

(57) ABSTRACT

When a diagnostic period of a specific failure arrives, a management center transmits, to a vehicle, an instruction to order execution of a failure diagnosis of the specific failure. When an ECU of the vehicle receives the instruction to order execution of the failure diagnosis from the management center, the ECU of the vehicle determines whether or not the failure diagnosis can be executed. When the failure diagnosis cannot be executed, the ECU causes the vehicle to continue traveling without executing the failure diagnosis, and ends a process. In this case, the ECU postpones the failure diagnosis in the current diagnostic period, and executes the failure diagnosis when a next diagnostic period arrives. When the ECU determines that the failure diagnosis can be executed, the ECU executes the failure diagnosis.

4 Claims, 3 Drawing Sheets

CONTROLLER FOR VEHICLE

This nonprovisional application is based on Japanese Patent Application No. 2019-035413 filed on Feb. 28, 2019 with the Japan Patent Office, the entire contents of which are hereby incorporated by reference.

BACKGROUND

Field

The present disclosure relates to a controller for a vehicle capable of automated driving.

Description of the Background Art

Japanese Patent Laying-Open No. 2018-5943 discloses a diagnosis system that sets a traveling route of a vehicle including diagnosis points such as uphill and downhill roads, a crank and the like, in order to execute a diagnosis of the vehicle capable of automated driving. The vehicle travels along the set traveling route toward a destination by automated driving, and travels through each diagnosis point on the way to the destination, to thereby execute a diagnosis of the vehicle.

SUMMARY

Among failures of a vehicle, there may be a failure that can be detected when the vehicle travels based on a specific traveling pattern (hereinafter, also referred to as "specific failure"). Examples of the traveling pattern include, for example, traveling that fluctuates an output of an engine, traveling during which a vehicle-mountable battery for traveling is repeatedly charged and discharged, and the like.

A traveling state is assumed to be more stable during automated driving than during manual driving by a user. Specifically, speed change and sudden acceleration and sudden deceleration are assumed to be less frequent during automated driving than during manual driving. That is, an output of an engine and charging and discharging of a battery for traveling are more likely to be kept relatively constant during automated driving than during manual driving. Therefore, even if the vehicle travels through each diagnosis point as in the diagnosis system disclosed in Japanese Patent Laying-Open No. 2018-5943, traveling based on an intended traveling pattern cannot possibly be achieved and thus a specific failure cannot possibly be detected appropriately.

The present disclosure has been made to solve the above-described problem, and an object of the present disclosure is to appropriately detect a specific failure in a vehicle capable of automated driving.

A controller for a vehicle according to the present disclosure is a controller for a vehicle capable of automated driving, the controller including: a storage unit that stores at least one traveling pattern for executing a failure diagnosis of the vehicle; and a control unit that controls traveling of the vehicle. When a diagnostic period of the failure diagnosis arrives during automated driving, the control unit determines whether or not the failure diagnosis can be executed. When the failure diagnosis can be executed, the control unit controls the vehicle to travel based on the traveling pattern, and executes the failure diagnosis.

According to the above-described configuration, when the diagnostic period of the failure diagnosis arrives, it is determined whether or not the failure diagnosis can be executed. When it is determined that the failure diagnosis can be executed, the vehicle is controlled such that the vehicle travels based on the traveling pattern. The vehicle travels based on the traveling pattern, and thus, data for detecting a specific failure can be obtained. Therefore, the presence or absence of the specific failure can be diagnosed appropriately.

In an embodiment, the controller for the vehicle further includes an information obtaining unit that obtains traveling information of the vehicle. Using the traveling information, the control unit determines whether or not the failure diagnosis can be executed.

According to the above-described configuration, it is determined whether or not the failure diagnosis can be executed, using the traveling information. For example, when the failure diagnosis is executed such that a vehicle having a battery for traveling mounted thereon travels based on a traveling pattern in which the battery for traveling is repeatedly charged and discharged, the vehicle can undergo acceleration and deceleration. Therefore, using the traveling information, it is determined that there are no other vehicles running at the front and at the back of the vehicle, that a distance equal to or longer than a certain distance is maintained between the vehicle and the other vehicles running at the front and at the back of the vehicle, or the like. Thus, it can be determined that the vehicle can travel based on the traveling pattern without affecting the other vehicles. That is, it can be determined that the failure diagnosis can be appropriately executed.

In an embodiment, the traveling patterns corresponding to contents of the failure diagnosis are stored in the storage unit. Depending on the traveling pattern, the control unit determines, using different determination criteria, whether or not the failure diagnosis can be executed.

The requested traveling pattern varies depending on the content of the failure diagnosis. The determination criterion for determining whether or not the failure diagnosis can be executed may vary depending on the traveling pattern executed in the failure diagnosis (depending on how the vehicle travels). According to the above-described configuration, depending on the traveling pattern, different determination criteria are used to determine whether or not the failure diagnosis can be executed. Thus, it can be appropriately determined whether or not the failure diagnosis can be executed.

In an embodiment, the control unit executes the failure diagnosis when the vehicle is traveling with an occupant not on board.

Since the vehicle travels based on the traveling pattern in the failure diagnosis, a traveling state can be unstable due to, for example, repeated acceleration and deceleration. Therefore, when the user is on board, the user may have a feeling of strangeness or a feeling of discomfort about the unstable traveling state. According to the above-described configuration, the failure diagnosis is executed when the vehicle is traveling with an occupant not on board, i.e., when the user is not on board. Therefore, it is possible to appropriately detect a specific failure, while reducing the user's feeling of strangeness or feeling of discomfort caused by execution of the failure diagnosis.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
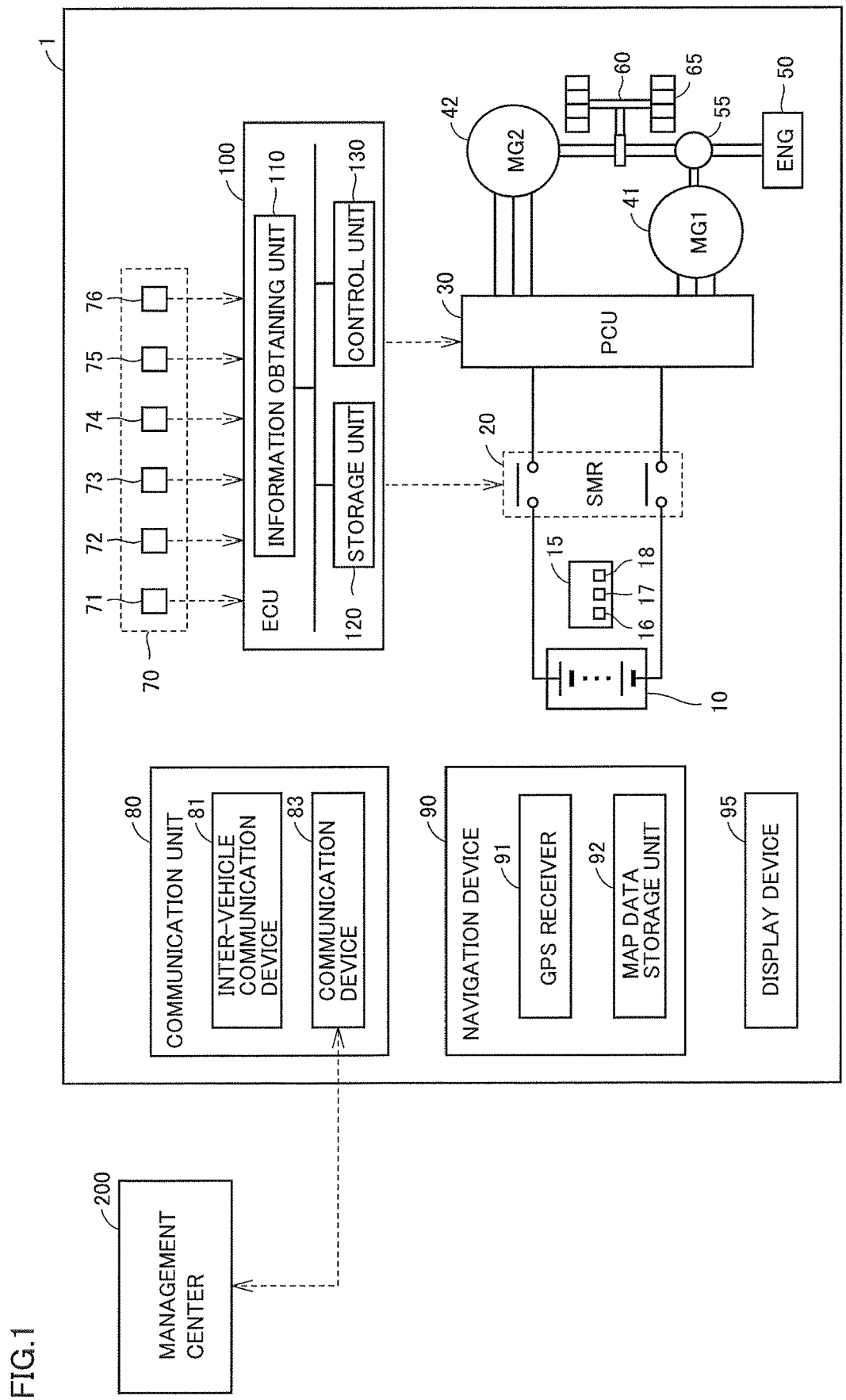
FIG. 1 is a block diagram showing a configuration example of a vehicle and a management center according to an embodiment.

Embodiments of the present disclosure will be described in detail hereinafter with reference to the drawings, in which the same or corresponding portions are denoted by the same reference characters and description thereof will not be repeated.

First Embodiment

<Overall Configuration>

FIG. 1 is a block diagram showing a configuration example of a vehicle 1 and a management center 200 according to the present embodiment. Management center 200 bidirectionally communicates with vehicle 1 through a communication network such as the Internet, and manages a state of vehicle 1. For example, management center 200 manages an execution status of a failure diagnosis of vehicle 1.

Vehicle 1 is a hybrid vehicle capable of automated driving. The automated driving refers to autonomous traveling of vehicle 1 based on information provided from various sensors and information provided from other vehicles, without any driving operation by an occupant of vehicle 1. In the automated driving, each actuator of vehicle 1 is, for example, controlled such that vehicle 1 autonomously travels along a travel path selected based on various types of information (information provided from a sensor group 70 and information provided from a navigation device 90 as described below). Vehicle 1 may be any vehicle as long as it is a vehicle capable of automated driving. For example, vehicle 1 may be a vehicle powered only by an internal combustion engine, or may be an electric vehicle or a fuel cell vehicle.

Referring to FIG. 1, vehicle 1 includes a power storage device 10, a monitoring unit 15, a system main relay (hereinafter, also referred to as "SMR") 20, a power control unit (hereinafter, also referred to as "PCU") 30, motor generators (hereinafter, also referred to as "MGs") 41 and 42, an engine 50, a power split device 55, a drive shaft 60, a driving wheel 65, and an ECU (Electronic Control Unit) 100. Vehicle 1 further includes sensor group 70, a communication unit 80, navigation device 90, and a display device 95.

Power storage device 10 is mounted on vehicle 1 as a driving power supply (i.e., a motive power source) for vehicle 1. Power storage device 10 includes a plurality of stacked batteries. Each of the batteries is a secondary battery such as, for example, a nickel-metal hydride battery or a lithium ion battery. Alternatively, each of the batteries may be a battery having a liquid electrolyte between a positive electrode and a negative electrode, or may be a battery having a solid electrolyte (all-solid-state battery). Power storage device 10 may be any power storage device as long as it is a rechargeable DC power supply, and a large-capacitance capacitor can also be used.

Monitoring unit 15 monitors a state of power storage device 10. Specifically, monitoring unit 15 includes a voltage sensor 16 that detects a voltage VB of power storage device 10, a current sensor 17 that detects a current IB input to and output from power storage device 10, and a temperature sensor 18 that detects a temperature of power storage device 10. Each sensor outputs a signal indicating the result of detection to ECU 100. In the following description, current IB during charging has a negative sign and current IB during discharging has a positive sign.

SMR 20 is electrically connected between PCU 30 and power storage device 10. When SMR 20 is closed, electric power is supplied from power storage device 10 to PCU 30. When SMR 20 is opened, electric power is not supplied from power storage device 10 to PCU 30.

In accordance with a control signal provided from ECU 100, PCU 30 converts DC power stored in power storage device 10 into AC power and supplies the AC power to motor generators 41 and 42. PCU 30 also converts AC power generated by motor generators 41 and 42 into DC power and supplies the DC power to power storage device 10. PCU 30 controls states of motor generators 41 and 42 individually. For example, PCU 30 can bring motor generator 42 into a power running state while bringing motor generator 41 into a regenerative state. PCU 30 includes, for example, two inverters provided to correspond to motor generators 41 and 42, and a converter that boosts a DC voltage supplied to each inverter into a voltage that is equal to or higher than an output voltage of power storage device 10.

Each of motor generators 41 and 42 is an AC rotating electric machine, and is, for example, a three-phase AC rotating electric machine including a permanent magnet embedded in a rotor (not shown). Motor generator 41 is coupled to a crank shaft of engine 50 with power split device 55 being interposed. Motor generator 41 rotates the crank shaft of engine 50 using the electric power of power storage device 10, when engine 50 is started. Motor generator 41 can also generate electric power using the motive power of engine 50. The AC power generated by motor generator 41 is converted by PCU 30 into DC power, which is charged into power storage device 10. The AC power generated by motor generator 41 may in some cases be supplied to motor generator 42.

Motor generator 42 rotates drive shaft 60 using at least one of the electric power supplied from power storage device 10 and the electric power generated by motor generator 41. Motor generator 42 can also generate electric power by regenerative braking during braking and during reduction in acceleration. The AC power generated by motor generator 42 is converted by PCU 30 into DC power, which is charged into power storage device 10.

Engine 50 is an internal combustion engine such as, for example, a gasoline engine or a diesel engine. Engine 50 is controlled in accordance with a control signal provided from ECU 100.

Power split device 55 is, for example, a planetary gear mechanism having three rotation shafts of a sun gear, a carrier and a ring gear. Power split device 55 divides the motive power generated by engine 50 into motive power transmitted to driving wheel 65 and motive power transmitted to motor generator 41.

Sensor group 70 includes various sensors that detect an external situation of vehicle 1 and detect the traveling state of vehicle 1. Specifically, sensor group 70 includes a camera 71, a radar 72, a LIDAR (Laser Imaging Detection and Ranging) 73, a vehicle speed sensor 74, an acceleration sensor 75, and a gyro sensor 76. Various types of information detected by sensor group 70 correspond to one example of "traveling information" according to the present disclosure.

Camera 71 captures an image of the external situation of vehicle 1 and outputs the image information about the external situation of vehicle 1 to ECU 100.

Radar 72 transmits a radio wave (e.g., millimeter wave) to the surroundings of vehicle 1 and receives a radio wave reflected by an obstacle to thereby detect the obstacle. Radar 72 outputs, for example, a distance to the obstacle and a direction of the obstacle to ECU 100 as the obstacle information about the obstacle.

LIDAR 73 transmits light (typically, ultraviolet rays, visible rays or near-infrared rays) to the surroundings of vehicle 1 and receives light reflected by an obstacle to thereby measure a distance to a reflection point and detect the obstacle. LIDAR 73 outputs, for example, a distance to the obstacle and a direction of the obstacle to ECU 100 as the obstacle information.

Vehicle speed sensor 74 is provided at driving wheel 65, drive shaft 60 or the like of vehicle 1. Vehicle speed sensor 74 detects, for example, a rotation speed of driving wheel 65 and outputs the vehicle speed information including a speed of vehicle 1 to ECU 100.

Acceleration sensor 75 includes, for example, a front-back acceleration sensor that detects an acceleration of vehicle 1 in a front-back direction, and a lateral acceleration sensor that detects a lateral acceleration of vehicle 1. Acceleration sensor 75 outputs, to ECU 100, the acceleration information including both the acceleration of vehicle 1 in the front-back direction and the lateral acceleration of vehicle 1.

Gyro sensor 76 detects an inclination of vehicle 1 from a horizontal direction. Specifically, gyro sensor 76 detects an inclination of vehicle 1 in the front-back direction relative to the horizontal direction and an inclination of vehicle 1 in a right-left direction relative to the horizontal direction. Gyro sensor 76 outputs the result of detection to ECU 100 as the gradient information of the travel path of vehicle 1.

Communication unit 80 includes an inter-vehicle communication device 81 and a communication device 83. Inter-vehicle communication device 81 wirelessly communicates with other vehicles around vehicle 1. In inter-vehicle communication, information such as start, stop, acceleration, and deceleration is, for example, transmitted from a vehicle traveling at the front to a vehicle traveling at the back.

Communication device 83 bidirectionally communicates with management center 200 through the communication network such as the Internet.

Navigation device 90 includes a GPS (Global Positioning System) receiver 91 that identifies a current location of vehicle 1 based on a radio wave provided from an artificial satellite, and a map data storage unit 92 that stores map data. Navigation device 90 performs various navigation processes of vehicle 1 using the information (GPS information) of the current location of vehicle 1 identified by GPS receiver 91. More specifically, navigation device 90 calculates a traveling route from the current location of vehicle 1 to a destination based on the GPS information of vehicle 1 and the road map data stored in map data storage unit 92, and outputs the information about the traveling route to ECU 100.

Display device 95 displays information for providing various pieces of information to the outside of vehicle 1. Display device 95 is, for example, a liquid crystal display, an electric bulletin board or the like. Display device 95 displays various pieces of information in accordance with an instruction provided from ECU 100.

ECU 100 receives the signals from the respective sensors and outputs the control signals to the respective devices, and also controls the respective devices. The control can be implemented not only by software but also by dedicated hardware (electronic circuit).

ECU 100 includes an information obtaining unit 110, a storage unit 120 and a control unit 130. Information obtaining unit 110 obtains the result of detection by each sensor from sensor group 70. Information obtaining unit 110 also obtains, from communication unit 80, information received from the outside (another vehicle and/or management center 200). Storage unit 120 includes a ROM (Read Only Memory) and a RAM (Random Access Memory), and stores a program executed by ECU 100 and the like. Control unit 130 expands the program stored in the ROM into the RAM for execution.

<Self-Diagnosis and Failure Diagnosis>

ECU 100 executes a self-diagnosis for diagnosing whether or not each device (such as power storage device 10, monitoring unit 15, motor generators 41 and 42, engine 50, a steering device (not shown), a braking device (not shown), and a direction indicator (not shown)) of vehicle 1 has a failure. Specifically, when a diagnosis condition is satisfied, ECU 100 diagnoses whether or not each device of vehicle 1 has a failure. The diagnosis condition is predetermined for each diagnosis item of each device, and when any one of the diagnosis conditions is satisfied, ECU 100 executes a self-diagnosis corresponding to the diagnosis condition. The diagnosis conditions include, for example, the prescribed number of times of repetitions of charging and discharging of power storage device 10 during traveling, fluctuations in an output request to engine 50 by a prescribed amount or larger, traveling that requires the direction indicator to light up, and the like.

The self-diagnosis is executed when the diagnosis condition is satisfied during traveling, and thus, the failure can be detected even at the timing other than the timing of bringing vehicle 1 to a dealer or a repair shop.

Among failures of vehicle 1, there may be a failure (specific failure) that can be detected when vehicle 1 travels based on a specific traveling pattern. One example of the specific failure is, for example, an abnormality of an internal resistance of power storage device 10. Although the details will be described below, it is desirable to travel such that power storage device 10 is repeatedly charged and discharged, in order to appropriately detect the abnormality of the internal resistance of power storage device 10. That is, as a diagnosis condition for executing a diagnosis of the internal resistance of power storage device 10 in the self-diagnosis, the condition of "the prescribed number of times of repetitions of charging and discharging of power storage device 10" is set, for example.

However, the traveling state is assumed to be more stable during automated driving than during manual driving by a user. Specifically, speed change and sudden acceleration and sudden deceleration are assumed to be less frequent during automated driving than during manual driving. That is, an output of engine 50 and charging and discharging of power storage device 10 are more likely to be kept relatively constant during automated driving than during manual driving. The manual driving means that vehicle 1 travels based on the driving operation (such as the handle operation, the brake operation and the accelerator operation) by a driver.

Therefore, an opportunity for vehicle 1 to travel such that power storage device 10 is repeatedly charged and discharged is assumed to be fewer during automated driving than during manual driving. Therefore, an opportunity to diagnose the internal resistance of power storage device 10 can decrease, and thus, the abnormality of the internal resistance of power storage device 10 cannot possibly be detected. That is, an opportunity for vehicle 1 to travel such that the diagnosis condition for detecting the specific failure is satisfied is assumed to be fewer during automated driving than during manual driving. Thus, the specific failure cannot possibly be detected appropriately.

Accordingly, ECU 100 of vehicle 1 according to the present embodiment controls vehicle 1 such that vehicle 1 intentionally travels every prescribed period based on the traveling pattern that satisfies the diagnosis condition, to thereby execute the self-diagnosis of the specific failure. Specifically, the traveling pattern and the diagnostic period are predetermined for each specific failure, and when a diagnostic period for a specific failure arrives, vehicle 1 is controlled to travel based on a traveling pattern corresponding to the specific failure. Management center 200, for example, manages whether or not the diagnostic period for the specific failure arrives. When the diagnostic period arrives, an instruction to order traveling based on the traveling pattern corresponding to the specific failure is transmitted from management center 200 to vehicle 1. That is, even if satisfaction of the diagnosis condition for the specific failure is difficult, vehicle 1 travels based on the traveling pattern corresponding to the specific failure and obtains desirable data, when the predetermined diagnostic period arrives, to thereby execute the self-diagnosis. In the following description, the self-diagnosis for diagnosing the specific failure by causing vehicle 1 to intentionally travel every prescribed period based on the traveling pattern that satisfies the diagnosis condition will also be referred to as "failure diagnosis". "Instruction to order traveling based on the traveling pattern corresponding to the specific failure", which is transmitted from management center 200 to vehicle 1, is regarded as "instruction to order execution of the failure diagnosis".

<<Specific Example of Specific Failure, and Whether or not Traveling Based on Corresponding Traveling Pattern is Possible>>

The failure diagnosis will be described in detail below. Storage unit 120 of ECU 100 stores a predetermined traveling pattern for each specific failure. When control unit 130 receives, from management center 200, an instruction to order execution of a failure diagnosis of a specific failure, control unit 130 determines whether or not traveling based on the traveling pattern in accordance with the instruction is possible. That is, control unit 130 determines whether or not the failure diagnosis of the specific failure whose diagnostic period arrives can be executed. When control unit 130 determines that the failure diagnosis can be executed, control unit 130 controls vehicle 1 such that vehicle 1 travels based on the traveling pattern, and executes the failure diagnosis. Hereinafter, specific examples of four specific failures of (1) to (4) will be described, and examples of determination as to whether or not traveling based on the traveling pattern corresponding to the specific failure is possible, i.e., whether or not the failure diagnosis can be executed will be described.

(1) An example of diagnosing an abnormality of the internal resistance of power storage device 10, which is one of the specific failures, will be described. When a predetermined diagnostic period for the internal resistance of power storage device 10 arrives, an instruction to order execution of a failure diagnosis is transmitted from management center 200 to vehicle 1. When the instruction is received, ECU 100 reads, from storage unit 120, a traveling pattern corresponding to a diagnosis of the internal resistance of power storage device 10.

Figure 2:
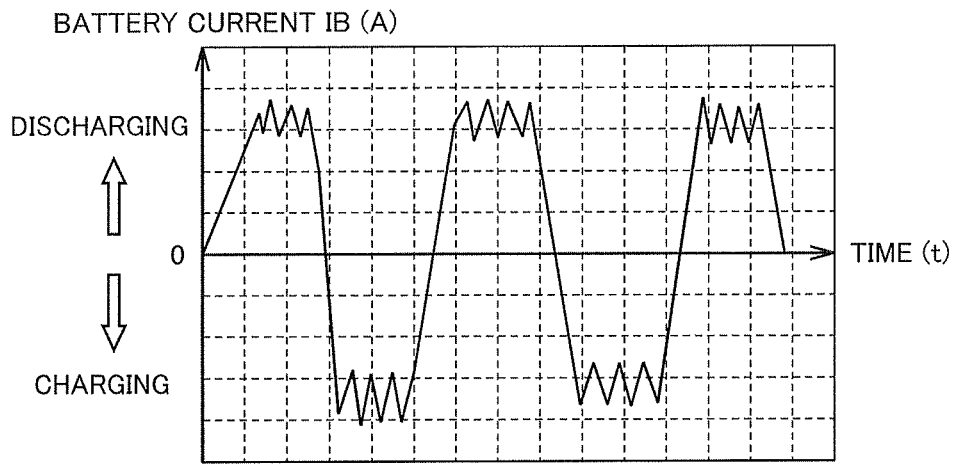
FIG. 2 is a diagram for illustrating one example of a traveling pattern corresponding to a diagnosis of an internal resistance of a power storage device.
Figure 3:
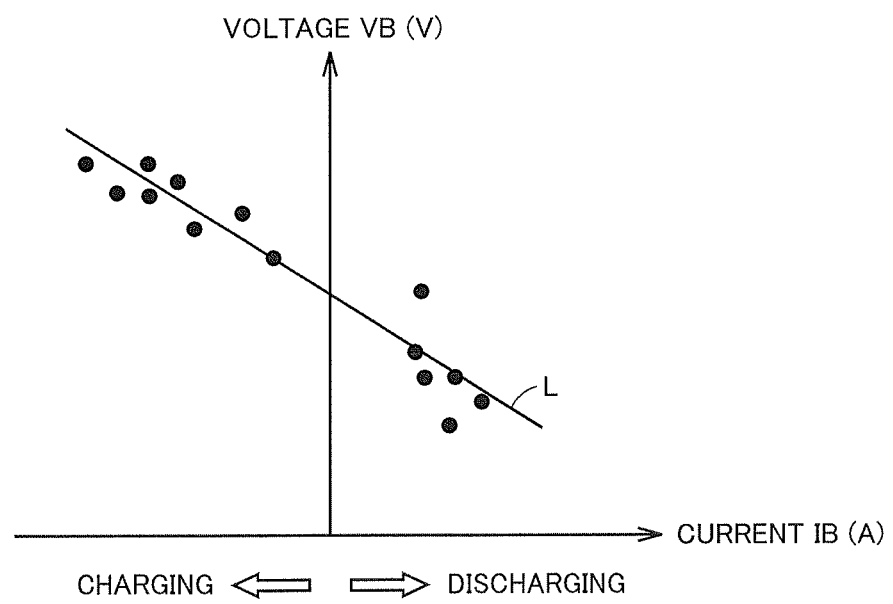
FIG. 3 is a diagram for illustrating a method for calculating the internal resistance.

FIG. 2 is a diagram for illustrating one example of the traveling pattern corresponding to the diagnosis of the internal resistance of power storage device 10. In FIG. 2, the horizontal axis indicates the time, and the vertical axis indicates current IB. FIG. 3 is a diagram for illustrating a method for calculating the internal resistance. In FIG. 3, the horizontal axis indicates current IB, and the vertical axis indicates voltage VB.

As shown in FIG. 2, the traveling pattern corresponding to the diagnosis of the internal resistance of power storage device 10 is such that power storage device 10 is repeatedly charged and discharged the prescribed number of times. A set (IB, VB) of current IB and voltage VB of power storage device 10 when vehicle 1 travels based on such traveling pattern is obtained from monitoring unit 15. Then, a plurality of sets of current IB and voltage VB thus obtained are plotted on a two-dimensional coordinate in which the horizontal axis indicates current IB and the vertical axis indicates voltage VB, as shown in FIG. 3. Then, an inclination of a straight line L that approximates the plurality of points thus obtained is calculated, and the calculated inclination of straight line L can be defined as the internal resistance of power storage device 10. Then, the internal resistance is compared with, for example, a reference internal resistance prestored in storage unit 120 of ECU 100, and it can thereby be diagnosed whether or not the internal resistance of power storage device 10 has an abnormality.

The traveling pattern corresponding to the diagnosis of the internal resistance of power storage device 10 is a traveling pattern in which power storage device 10 is repeatedly charged and discharged as described above, and thus, vehicle 1 can undergo acceleration and deceleration. During charging, electric power generated by regenerative braking of motor generator 42 is, for example, charged into power storage device 10 through PCU 30. Therefore, during traveling based on a traveling mode with engine 50 stopped (EV traveling mode), for example, vehicle 1 can undergo deceleration. In contrast, during discharging, an output of motor generator 42 is increased to thereby increase electric power supply from power storage device 10. Therefore, during traveling based on the EV traveling mode, for example, vehicle 1 can undergo acceleration.

Accordingly, a determination criterion for determining whether or not the failure diagnosis can be executed is such that there are no other vehicles running at the front and at the back of vehicle 1, that a distance equal to or longer than a certain distance is maintained between vehicle 1 and the other vehicles running at the front and at the back of vehicle 1, or the like. The traveling information provided from sensor group 70, and specifically various types of information provided from camera 71, radar 72, LIDAR 73, and vehicle speed sensor 74 are used to determine whether or not the failure diagnosis can be executed.

Figure 4:
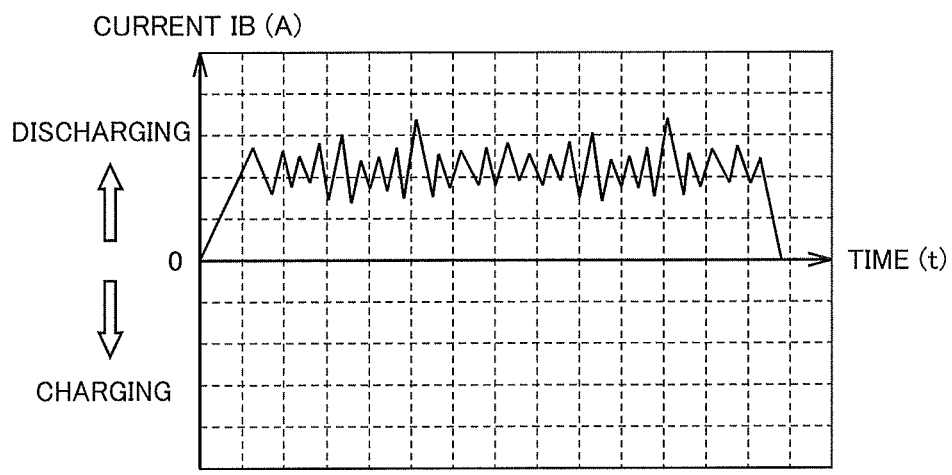
FIG. 4 is a diagram for illustrating one example of a traveling pattern corresponding to a diagnosis of a deterioration state of the power storage device.

(2) Next, an example of diagnosing an abnormality of a deterioration state of power storage device 10, which is one of the specific failures, will be described. FIG. 4 is a diagram for illustrating one example of a traveling pattern corresponding to the diagnosis of the deterioration state of power storage device 10. In FIG. 4, the horizontal axis indicates the time, and the vertical axis indicates current IB.

As shown in FIG. 4, the traveling pattern corresponding to the diagnosis of the deterioration state of power storage device 10 is such that constant electric power is discharged from power storage device 10. That is, the traveling pattern is, for example, such that vehicle 1 travels on a flat road at a constant speed. By causing vehicle 1 to travel for a certain amount of time period based on such traveling pattern and discharging the constant electric power from power storage device 10, an amount of decrease in SOC of power storage device 10 is calculated. Specifically, power storage device 10 starts discharging at a constant current from a state of a prescribed SOC (e.g., 80%), and continues discharging for a certain amount of time period. Based on the degree of decrease in SOC of power storage device 10 from the prescribed SOC in this case, the deterioration state of power storage device 10 is diagnosed. As power storage device 10 becomes more deteriorated, the amount of decrease in SOC caused by discharging at the constant current for the certain amount of time period becomes larger. The calculated amount of decrease in SOC is compared with a reference amount of decrease in SOC prestored in storage unit 120 of ECU 100, and the deterioration state of power storage device 10 can thereby be diagnosed. Traveling based on the traveling pattern corresponding to the diagnosis of the deterioration state of power storage device 10 is traveling during which vehicle 1 continues traveling at constant electric power. Therefore, a determination criterion for determining whether or not the failure diagnosis can be executed is such that vehicle 1 can travel at a constant speed for a prescribed time period, or the like. Specifically, the absence of another vehicle running at the front of vehicle 1, the absence of a traffic light at the front of vehicle 1, or the like is used as the determination criterion. The traveling information provided from sensor group 70, and specifically various types of information provided from camera 71, radar 72, LIDAR 73, and vehicle speed sensor 74 are used to determine whether or not the failure diagnosis can be executed.

(3) Furthermore, an example of diagnosing an abnormality of a throttle valve of engine 50, which is one of the specific failures, will be described. A traveling pattern corresponding to the diagnosis of the throttle valve of engine 50 is a traveling pattern that fluctuates an output request to engine 50 by a prescribed amount or larger. For example, when a request to increase the output of engine 50 is issued, it is diagnosed whether or not the throttle valve opens to follow the request. For example, when sticking occurs in the throttle valve, the output of engine 50 does not follow the varying output request to engine 50.

Traveling based on the traveling pattern corresponding to the diagnosis of the throttle valve of engine 50 may involve the variation in output of engine 50, and thus, can involve acceleration and deceleration of vehicle 1. Therefore, a determination criterion for determining whether or not the failure diagnosis can be executed is such that there is no other vehicles running at the front and at the back of vehicle 1, that a distance equal to or longer than a certain distance is maintained between vehicle 1 and the other vehicles running at the front and at the back of vehicle 1, or the like. The traveling information provided from sensor group 70, and specifically various types of information provided from camera 71, radar 72, LIDAR 73, and vehicle speed sensor 74 are used to determine whether or not the failure diagnosis can be executed.

(4) Furthermore, an example of diagnosing an abnormality of the steering device, which is one of the specific failures, will be described. In the diagnosis of the steering device, the responsiveness to a steering instruction is, for example, diagnosed. Specifically, the time required from when a rightward/leftward steering instruction is output from ECU 100 to when vehicle 1 starts turning is, for example, diagnosed.

Traveling based on the traveling pattern corresponding to the diagnosis of the steering device is traveling in which vehicle 1 swings to the right/left during traveling. Therefore, a determination criterion for determining whether or not the failure diagnosis can be executed is such that there are no other vehicles or an obstacle on the right and left sides of vehicle 1. The traveling information provided from sensor group 70, and specifically various types of information provided from camera 71, radar 72, LIDAR 73, vehicle speed sensor 74, acceleration sensor 75, and gyro sensor 76 are used to determine whether or not the failure diagnosis can be executed.

<Process Executed by ECU>

Figure 5:
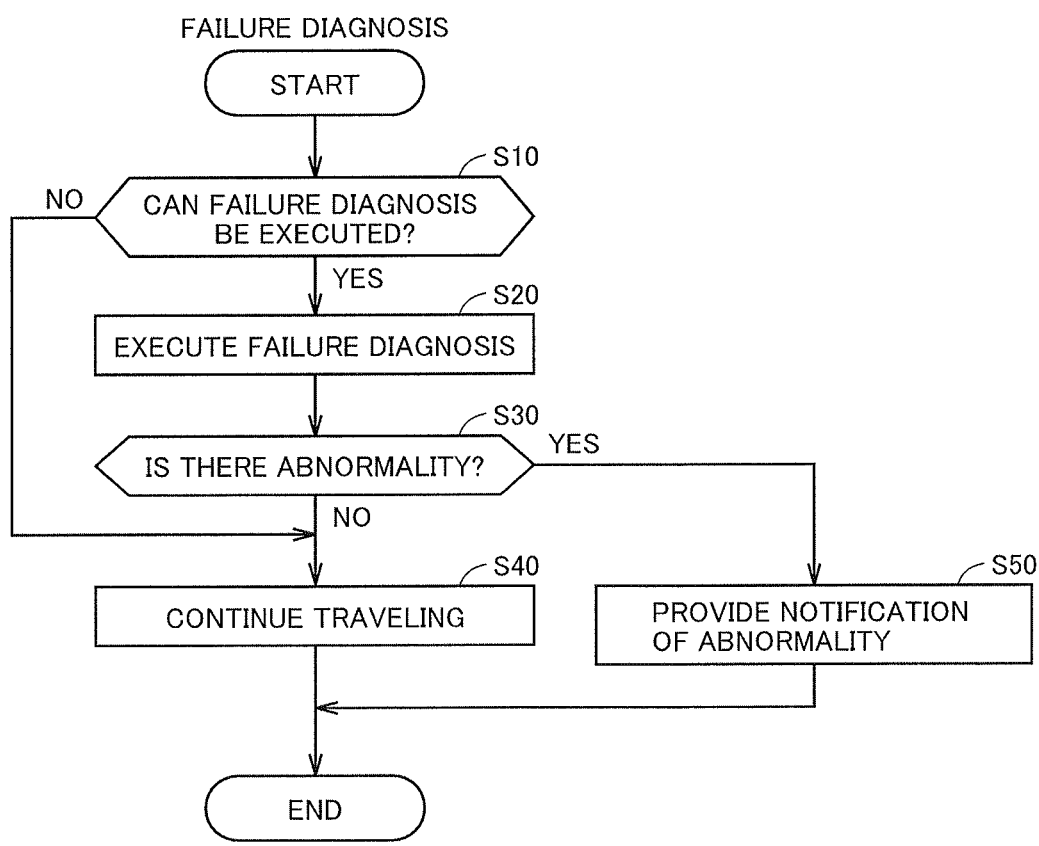
FIG. 5 is a flowchart showing a process procedure executed by an ECU when a diagnostic period for a specific failure arrives.

FIG. 5 is a flowchart showing a process procedure executed by ECU 100 when the diagnostic period for the specific failure arrives. The flowchart is started when the instruction to order execution of the failure diagnosis is received from management center 200. Although description will be given of the case in which each step (hereinafter, abbreviated as "S") in the flowchart shown in FIG. 5 is implemented by software processing by ECU 100, a part or all of the steps may be implemented by hardware (electric circuit) fabricated in ECU 100.

When ECU 100 receives the instruction to order execution of the failure diagnosis from management center 200, ECU 100 starts the process in the flowchart and first determines whether or not the failure diagnosis can be executed (S10). As one example, let us assume that the diagnostic period for the internal resistance of power storage device 10 arrives. When control unit 130 of ECU 100 receives the instruction to order execution of the failure diagnosis from management center 200 through communication device 83, control unit 130 of ECU 100 reads, from storage unit 120, the traveling pattern corresponding to the specific failure (internal resistance of power storage device 10) whose diagnostic period arrives, based on the instruction. Then, based on the traveling information obtained by information obtaining unit 110, control unit 130 determines whether or not vehicle 1 can travel based on the traveling pattern. Specifically, control unit 130 determines whether or not to satisfy the condition that there are no other vehicles running at the front and at the back of vehicle 1, or the condition that a distance between vehicle 1 and a vehicle running at the front of vehicle 1 is sufficient and a distance between vehicle 1 and a vehicle running at the back of vehicle 1 is sufficient.

For example, when control unit 130 determines that the failure diagnosis cannot be executed because the distance between vehicle 1 and the vehicle running at the back of vehicle 1 is short (NO in S10), control unit 130 causes vehicle 1 to continue traveling without executing the failure diagnosis (S40), and ends the process. In this case, control unit 130 postpones the failure diagnosis in the current diagnostic period, and executes the failure diagnosis when a next diagnostic period arrives. Alternatively, control unit 130 may execute the failure diagnosis at a period shorter than the diagnostic period.

When control unit 130 determines that the failure diagnosis can be executed (YES in S10), control unit 130 executes the failure diagnosis (S20). Specifically, control unit 130 controls vehicle 1 such that vehicle 1 travels based on the traveling pattern read from storage unit 120. Then, control unit 130 causes vehicle 1 to continue traveling based on the traveling pattern for a predetermined time period, and obtains the set of current IB and voltage VB of power storage device 10 from monitoring unit 15 during traveling, to thereby calculate the internal resistance.

Then, control unit 130 compares the calculated internal resistance of power storage device 10 with the reference internal resistance. When a difference between the calculated internal resistance of power storage device 10 and the reference internal resistance is small and it is determined that there is no abnormality in the failure diagnosis (NO in S30), control unit 130 stores the result of the failure diagnosis in storage unit 120 and causes vehicle 1 to continue traveling (S40).

In contrast, when the difference between the calculated internal resistance of power storage device 10 and the reference internal resistance is great and it is determined that there is an abnormality in the failure diagnosis (YES in S30), control unit 130 stores the result of the failure diagnosis in storage unit 120 and provides a notification of the abnormality (S50). The notification of the abnormality is provided by, for example, causing a display screen of navigation device 90 or a multi information display (not shown) provided on an instrument panel to display a message for warning that power storage device 10 has an abnormality, giving a warning by sound, and the like.

As described above, in vehicle 1 according to the present embodiment, the self-diagnosis (failure diagnosis) for diagnosing the specific failure is executed by causing vehicle 1 to intentionally travel every prescribed period based on the traveling pattern that satisfies the diagnosis condition. Therefore, in automated driving during which the traveling state is assumed to be more stable than during manual driving, loss of an opportunity to diagnose the specific failure caused by non-satisfaction of the diagnosis condition can be reduced.

When the diagnostic period arrives, the instruction to order execution of the failure diagnosis is transmitted from management center 200 to vehicle 1. When vehicle 1 receives the instruction, vehicle 1 determines whether or not the failure diagnosis can be executed, i.e., whether or not vehicle 1 can travel based on the traveling pattern. When vehicle 1 determines that the failure diagnosis can be executed, vehicle 1 travels based on the traveling pattern. Since vehicle 1 travels based on the traveling pattern, vehicle 1 can obtain data for detecting the specific failure. Therefore, the presence or absence of the specific failure can be diagnosed appropriately.

The failure diagnosis may be executed when vehicle 1 travels with an occupant not on board (hereinafter, also referred to as "during unmanned vehicle traveling"), i.e., when the user is not on board. For example, in the failure diagnosis, the traveling state can be unstable because vehicle 1 repeatedly accelerates and decelerates based on the traveling pattern. Therefore, when vehicle 1 travels with the user on board (hereinafter, also referred to as "during manned vehicle traveling"), the user may have a feeling of strangeness or a feeling of discomfort about the unstable traveling state. Accordingly, by executing the failure diagnosis when the diagnostic period of the failure diagnosis arrives and when vehicle 1 travels with an occupant not on board, it is possible to appropriately detect the specific failure, while reducing the user's feeling of strangeness or feeling of discomfort caused by execution of the failure diagnosis.

When vehicle 1 executes the failure diagnosis, vehicle 1 may notify the outside of vehicle 1 that the failure diagnosis is in execution. For example, when vehicle 1 executes the failure diagnosis, vehicle 1 may turn on a hazard lamp. This can attract attention of the outside of vehicle 1.

Alternatively, vehicle 1 may cause display device 95 to display characters indicating that the failure diagnosis is in execution in such a manner that the characters can be visually recognized by a vehicle running at the back of vehicle 1, for example. As a result, the outside of vehicle 1 can be notified that the failure diagnosis is in execution. By notifying the outside of vehicle 1 that the failure diagnosis is in execution, the outside of vehicle 1 can be notified of the possibility that vehicle 1 repeatedly accelerates and decelerates.

In addition, when vehicle 1 executes the failure diagnosis, vehicle 1 may notify the inside of vehicle 1 that the failure diagnosis is in execution. For example, when vehicle 1 executes the failure diagnosis, vehicle 1 may cause the display screen of navigation device 90 or the multi information display provided on the instrument panel to display characters indicating that the failure diagnosis is in execution. By notifying the user that the failure diagnosis is in execution, it is possible to reduce the user's feeling of strangeness about continuation of the unstable traveling state such as repeated acceleration and deceleration.

(First Modification)

The embodiment has been described in connection with the example in which management center 200 manages the diagnostic period for the specific failure. However, the diagnostic period for the specific failure may be prestored in vehicle 1. For example, the diagnostic period for the specific failure is stored in storage unit 120 of ECU 100.

When the diagnostic period for the specific failure arrives, ECU 100 starts the flowchart in FIG. 5. The process in the flowchart is the same as that of the embodiment, and thus, description will not be repeated. Even when the diagnostic period for the specific failure is stored in vehicle 1, the same effect as that of the embodiment can be produced.

(Second Modification)

A threshold value for determining a failure in a failure diagnosis in a self-diagnosis may be set to be stricter than a threshold value for determining a failure in a self-diagnosis (hereinafter, also referred to as "normal self-diagnosis" in order to distinguish it from the failure diagnosis) other than the failure diagnosis.

The normal self-diagnosis is executed when the diagnosis condition is satisfied during traveling based on automated driving, without traveling based on the traveling pattern. Since vehicle 1 does not travel based on the traveling pattern in the normal self-diagnosis, the traveling state may vary under the influence of other vehicles running around vehicle 1. That is, in the normal self-diagnosis, the diagnosis is executed based on data obtained in an environment where the traveling state may vary.

In contrast, since vehicle 1 travels based on the traveling pattern in the failure diagnosis, the diagnosis is executed based on data obtained in a so-called expected traveling state.

Therefore, even when the diagnosis condition is satisfied in the normal self-diagnosis, an influence of a diagnosis error may be greater than that in the failure diagnosis. In other words, since the diagnosis can be executed in an expected traveling state in the failure diagnosis, the influence of the diagnosis error may be smaller than that in the normal self-diagnosis.

Accordingly, the threshold value for determining the failure in the failure diagnosis can be set to be stricter than the threshold value in the normal self-diagnosis. As a result, the accuracy of diagnosis of the specific failure can be improved.

(Third Modification)

When vehicle 1 capable of automated driving becomes widespread, the need to remove the risk of occurrence of a failure when the user is on board may arise. For example, when vehicle 1 fails during manned vehicle traveling, the user must arrange the alternative means to travel to a destination at that time, which requires time and labor. Accordingly, a threshold value for determining a failure in the self-diagnosis may be made different between during unmanned vehicle traveling and during manned vehicle traveling. Specifically, a threshold value for determining a failure during unmanned vehicle traveling is set to be stricter than a threshold value for determining a failure during manned vehicle traveling. As a result, a sign of the failure can be recognized during unmanned vehicle traveling.

For each item of the self-diagnosis, the threshold value during unmanned vehicle traveling and the threshold value during manned vehicle traveling are stored in storage unit 120 of ECU 100. The threshold value during unmanned vehicle traveling is set to be stricter than the threshold value during manned vehicle traveling. In a self-diagnosis executed during unmanned vehicle traveling, ECU 100 uses the threshold value during unmanned vehicle traveling. In a self-diagnosis executed during manned vehicle traveling, ECU 100 uses the threshold value during manned vehicle traveling.

Since the threshold value for determining the failure during unmanned vehicle traveling is set to be stricter than that during manned vehicle traveling, the failure is easily detected. That is, a sign of the failure can be recognized during unmanned vehicle traveling. When the sign of the failure is recognized during unmanned vehicle traveling, vehicle 1 is guided to, for example, a dealer or a repair shop. The user can preliminarily arrange the alternative means to travel to a destination.

Since the sign of the failure is recognized during unmanned vehicle traveling, it is possible to inhibit vehicle 1 from failing during manned vehicle traveling.

Various known methods can be applied to determination as to whether vehicle 1 travels with an occupant not on board or vehicle 1 travels with an occupant on board. For example, determination may be made using a seating sensor, or determination may be made using a vehicle-mountable camera that captures an image of the interior of vehicle 1. Alternatively, when vehicle 1 is started up by operation of a start button, it may be determined that vehicle 1 travels with an occupant on board.

(Fourth Modification)

The third modification has been described in connection with the example in which the threshold value during unmanned vehicle traveling and the threshold value during manned vehicle traveling are stored in storage unit 120 of ECU 100. In vehicle 1, the threshold value during unmanned vehicle traveling and the threshold value during manned vehicle traveling may be rewritten by the so-called OTA (Over The Air).

Specifically, when switching between unmanned vehicle traveling and manned vehicle traveling is performed, vehicle 1 provides a notification that switching between unmanned vehicle traveling and manned vehicle traveling is performed to management center 200 through communication device 83. When management center 200 receives, for example, a notification that switching from unmanned vehicle traveling to manned vehicle traveling is performed, management center 200 transmits the threshold value during manned vehicle traveling to vehicle 1. When management center 200 receives a notification that switching from manned vehicle traveling to unmanned vehicle traveling is performed, management center 200 transmits the threshold value during unmanned vehicle traveling to vehicle 1.

When vehicle 1 receives the threshold value during unmanned vehicle traveling or the threshold value during manned vehicle traveling from management center 200, vehicle 1 rewrites the program stored in storage unit 120 of ECU 100.

Even when the threshold value during unmanned vehicle traveling and the threshold value during manned vehicle traveling are rewritten by the OTA as described above, the same effect as that of the third modification can be produced.

(Fifth Modification)

In vehicle 1, the traveling pattern in the failure diagnosis may be rewritten by the OTA. For example, the traveling pattern corresponding to the diagnosis of the internal resistance of power storage device 10 in the failure diagnosis will be described by way of example.

The traveling pattern corresponding to the diagnosis of the internal resistance of power storage device 10 is a traveling pattern in which power storage device 10 is repeatedly charged and discharged the prescribed number of times. The internal resistance is calculated using voltage VB and current IB obtained when vehicle 1 travels based on such traveling pattern.

In the future, however, with the advance of technology, it will become possible to reduce the number of times of repetitions of charging and discharging, or calculate the internal resistance with a higher degree of accuracy by using another traveling pattern. In such a case, the traveling pattern corresponding to the diagnosis of the internal resistance of power storage device 10 is updated by the OTA. As a result, the failure diagnosis can be executed easily and with a higher degree of accuracy.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A controller for a vehicle capable of automated driving, the controller comprising:
    a storage unit that stores at least one predetermined traveling pattern that is used for executing a failure diagnosis of the vehicle corresponding to a specific failure; and
    a control unit that controls traveling of the vehicle, wherein
    when a diagnostic period of the failure diagnosis arrives during automated driving, the control unit determines whether or not the failure diagnosis can be executed, and when the failure diagnosis can be executed, the control unit controls the vehicle to travel based on the at least one predetermined traveling pattern, and executes the failure diagnosis based on whether or not a determined value exceeds a threshold value, wherein the control unit uses a first threshold value as the threshold value for detecting a failure in the failure diagnosis when there is no occupant in the vehicle, and the control unit uses a second threshold value as the threshold value for detecting a failure in the failure diagnosis when there is an occupant in the vehicle, and wherein the first threshold value is set at a value that makes it easier to detect the specific failure than the second threshold value.

2. The controller for the vehicle according to claim 1, further comprising an information obtaining unit that obtains traveling information of the vehicle, wherein using the traveling information, the control unit determines whether or not the failure diagnosis can be executed.

3. The controller for the vehicle according to claim 1, wherein the at least one predetermined traveling pattern comprises a plurality of predetermined travelling patterns, the plurality of predetermined traveling patterns respectively corresponding to specific failures are stored in the storage unit, and depending on the predetermined traveling pattern of the plurality of predetermined traveling patterns, the control unit determines, using different determination criteria based on sensor information of the vehicle, whether or not the failure diagnosis can be executed.

4. The controller for the vehicle according to claim 1, wherein the vehicle includes a communication device capable of communicating with a management center that manages the first threshold value and the second threshold value, when there is no occupant in the vehicle, the control unit obtains the first threshold value from the management center through the communication device and uses the first threshold value as the threshold value for diagnosing the failure, and when there is an occupant in the vehicle, the control unit obtains the second threshold value from the management center through the communication device and uses the second threshold value as the threshold value for diagnosing the failure.

* * * * *